US008717903B2

(12) United States Patent
Huang et al.

(10) Patent No.: US 8,717,903 B2
(45) Date of Patent: May 6, 2014

(54) TESTING METHOD AND APPARATUS APPLIED TO IP PHONE SYSTEM

(75) Inventors: Chung-Wen Huang, Taipei (TW); Chen-Wu Hsieh, Taipei (TW)

(73) Assignee: Inventec Corporation, Taipei (TW)

( * ) Notice: Subject to any disclaimer, the term of this patent is extended or adjusted under 35 U.S.C. 154(b) by 224 days.

(21) Appl. No.: 13/338,996

(22) Filed: Dec. 28, 2011

(65) Prior Publication Data

US 2013/0107720 A1    May 2, 2013

(30) Foreign Application Priority Data

Nov. 1, 2011 (TW) .............................. 100139866 A

(51) Int. Cl.
*H04L 12/26* (2006.01)
*G01R 15/12* (2006.01)
*G01R 31/00* (2006.01)

(52) U.S. Cl.
USPC ........... 370/241; 340/515; 702/118; 702/120; 703/13

(58) Field of Classification Search
USPC ................. 370/241; 702/108, 117, 118, 120; 716/136; 340/514, 515; 703/13
See application file for complete search history.

(56) References Cited

U.S. PATENT DOCUMENTS

| 2009/0313510 A1* | 12/2009 | Kim et al. ..................... 714/712 |
| 2011/0270970 A1* | 11/2011 | Lin et al. ..................... 709/224 |
| 2011/0307746 A1* | 12/2011 | Sullivan et al. ................ 714/57 |

* cited by examiner

*Primary Examiner* — Ahmed Elallam
(74) *Attorney, Agent, or Firm* — WPAT, PC; Justin King

(57) ABSTRACT

A testing method and an apparatus applied to an IP phone system for testing an electronic device is provided. The electronic device has a true table and signal ports. The electronic device is connected to a power generating jig and an IP phone simulator via a cable. A power generated by the power generating jig is provided. A first value power command issued by the IP phone simulator is provided. Whether the electronic device is able to correctly control the signal ports in response to the first value power command and the true table is determined. A second value power command issued by the IP phone simulator is provided. Whether the electronic device is able to correctly control the signal ports in response to the second value power command and the true table is determined. If so, it is concluded that the electronic device passes the test.

9 Claims, 5 Drawing Sheets

| Power Mode | Power level | DVI2 | USB1 | | USB2 | | USB3 | | USB4 | |
|---|---|---|---|---|---|---|---|---|---|---|
| | | | On/off | Cur limit | On/off | Cur limit | On/off | Cur limit | On/off | Cur limit |
| Fully Power | 25W | H | H | H | H | H | H | H | H | H |
| Core power 1 | 22W | H | H | H | H | H | H | L | H | L |
| Core power 1 | 15W | H | H | L | H | L | H | L | L | X |
| Core power 1 | 12W | H | H | L | L | L | L | X | L | X |
| Minimum Power | 10W | L | H | L | L | X | L | X | L | X |

FIG. 4

TESTING METHOD AND APPARATUS APPLIED TO IP PHONE SYSTEM

This application claims the benefit of Taiwan application Serial No. 100139866, filed Nov. 1, 2011, the subject matter of which is incorporated herein by reference.

BACKGROUND OF THE INVENTION

1. Field of the Invention

The invention relates in general to an IP phone system, and more particularly to a testing method and an apparatus applied to an IP phone system.

2. Description of the Related Art

With the popularity of network technology, a new telephone communication technology can be realized through the network. The IP phone which transmits data and audio/video service, has the advantages of low call and installation costs and easy expansion and has gradually been adopted by many international businesses.

Referring to FIG. 1A and FIG. 1B, schematic diagrams of a conventional IP phone system are respectively shown. The IP phone system 100 comprises an IP phone host 110 and an electronic device 120. Basically, the electronic device 120 is an optional device, and can be selectively connected to the IP phone host 110, such that the IP phone host 120 is equipped with more I/O ports and display function.

Basically, the IP phone host 100 has expansion ports 112 and 114 for connecting to other peripheral devices. The electronic device 120 can further be connected to the IP phone host 110, and can have more signal ports such as DVI video ports 121 and 122 and the USB ports 123, 124, 125, and 126 via which more peripheral devices can be plugged to the electronic device 120.

Referring to FIG. 2, a schematic diagram of the power supply of an IP phone system is shown. In the part of the IP phone system 100, the plug 132 of the power supply (power adapter) 130 is plugged to an AC power for providing a DC voltage (such as 48V) to the IP phone host 110 which is connected to the electronic device 120 via the spine cable 116. The spine cable 116 has eight signal lines, namely, a 5V signal line (SP_Vbus_5V), two none signal lines (none), a grounding signal line (GND), a detecting signal line (SP_Vbus_Det), a 1-wire signal line (1-wire), a 48V signal line (SP_48V), and a 48V return signal line (SP_48V_Ret).

Basically, the electronic device 120 does not have its own power supply, and the power supply relies on the IP phone host 110 which provides a 48V DC voltage to the electronic device 120 via two signal lines (SP_48V and SP_48V_Ret) of the cable 116.

Moreover, the electronic device 120 further comprises a micro-controller 128, and a DC converter 127. The DC converter 127 receives the 48V signal line (SP_48V) and the 48V return signal line (SP_48V_Ret) and converts 48V voltage into various DC voltages (such as +5V, +3.3V, +1.8V) provided for other circuit elements (not illustrated) of the electronic device 120 to use. In addition, the micro-controller 128 receives the 5V signal line (SP_Vbus_5V), the detecting signal line (SP_Vbus_Det), and the 1-wire signal line (1-wire). The micro-controller 128 powered by a 5V voltage provided by the 5V signal line (SP_Vbus_5V) determines whether the IP phone host 110 is plugged to a power source according to the power level of the detecting signal line (SP_Vbus_Det).

Since the power provided by the power supply 130 is limited and both the IP phone host 110 and the electronic device 120 can be connected to multiple peripheral elements, the power management of the IP phone host 110 must be effective.

For example, the power supply 130 provides a 25 W power to the IP phone host 110, the expansion port 112 of the IP phone host 110 is connected to a power-consuming 5 W first peripheral device (not illustrated), and the expansion port 114 is connected to a power-consuming 8 W second peripheral device (not illustrated). Therefore, the IP phone host 100 can provide at most a 12 W (25 W−5 W−8 W=12 W) voltage to the electronic device 120, and the IP phone host 110 transmits a 12 W power command to the micro-controller 128 of the electronic device 120 via the 1-wire signal line.

Alternatively, the expansion port 112 of the IP phone host 110 is connected to a power-consuming 8 W first peripheral device (not illustrated), but the expansion port 114 is not connected to any peripheral devices. Therefore, the IP phone host 100 can provide at most a 17 W (25 W−8 W=17 W) voltage to the electronic device 120, and the IP phone host 110 transmits a 17 W power command to the micro-controller 128 of the electronic device 120 via the 1-wire signal line.

Alternatively, both the expansion ports 112 and 114 of the IP phone host 110 are not connected to any peripheral devices. Therefore, the IP phone host 100 can provide at most a 25 W voltage to the electronic device 120, and the IP phone host 110 transmits a 25 W power command to the micro-controller 128 of the electronic device 120 via the 1-wire signal line.

When the micro-controller 128 of the electronic device 120 receives multiple power commands via the 1-wire signal line, the micro-controller 128 must perform suitable adjustment otherwise the electronic device 120 will be unable to operate normally. For example, when the micro-controller 128 receives a 25 W power command, the micro-controller 128 turns on all of the DVI ports 121 and 122 and the USB ports 123, 124, 125, and 126, and when the micro-controller 128 receives a 17 W power command, the micro-controller 128 turns on only some of the DVI ports 121 and 122 and the USB ports 123, 124, 125, and 126.

Since the power of the electronic device 120 is controlled by the IP phone host 110, the micro-controller 128 of the electronic device 120 needs to control the DVI ports 121 and 122 and the USB ports 123, 124, 125, and 126 in response to the power command issued by the IP phone host 110.

It can be known from the above disclosure that during the manufacturing process, the testing process of the electronic device 120 requires an IP phone host 110, and the testing process requires extra peripheral devices which are plugged to/unplugged from the expansion ports 112 and 114 of the IP phone host 110, such that the IP phone host 110 generates multiple power commands with various values. The testing personnel determine whether the electronic device 120 correctly controls the DVI ports 121 and 122 and the USB ports 123, 124, 125, and 126 according to multiple power commands with various values.

However, the above testing process is complicated and time consuming, the testing personnel need to have the peripheral devices plugged to/unplugged from the expansion ports 112 and 114 of the IP phone host 110 during the testing process of the electronic device 120. Therefore, the invention aims to make the testing process of the electronic device 120 more convenient and effective is what achieve.

SUMMARY OF THE INVENTION

The invention provides a testing method applied to an IP phone system for testing an electronic device. The electronic device has a true table and a plurality of signal ports. The electronic device is connected to a power generating jig and an IP phone simulator via a cable. A power generated by the power generating jig is provided to the electronic device. A first value power command issued by the IP phone simulator is provided to the electronic device. Whether the electronic device is able to correctly control the signal ports in response to the first value power command and the true table is determined. A second value power command issued by the IP phone simulator is provided to the electronic device. Whether the electronic device is able to correctly control the signal ports in response to the second value power command and the true table is determined. If the results in both the determination steps are affirmative, then it is concluded that the electronic device passes the test.

The invention provides a testing apparatus applied to an IP phone system connected to an electronic device of the IP phone system. The electronic device comprises a plurality of signal ports. The testing apparatus comprises a power supply, a power generating jig, and an IP phone simulator. The power supply has a plug for receiving and converting an AC power into a DC power. The power generating jig, connected to the power supply for receiving the DC power to generate a first voltage, comprises a first voltage signal line and a first voltage return signal line. The IP phone simulator has a 1-wire signal line via which multiple power commands with various values are outputted. The electronic device is connected to the first voltage signal line, the first voltage return signal line, and the 1-wire signal line, such that the electronic device controls the number of on/off signal ports in response to the multiple power commands with various values so as to determine whether the electronic device operates normally.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 4 shows a schematic diagram of a true table stored in a micro-controller.

DETAILED DESCRIPTION OF THE INVENTION

Figure 1A:
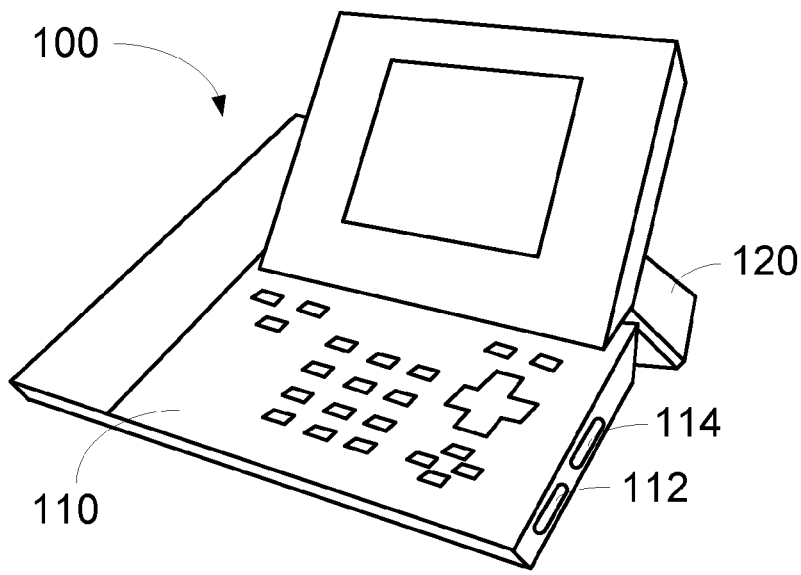
FIG. 1A and FIG. 1B are schematic diagrams of a conventional IP phone system.
Figure 1B:
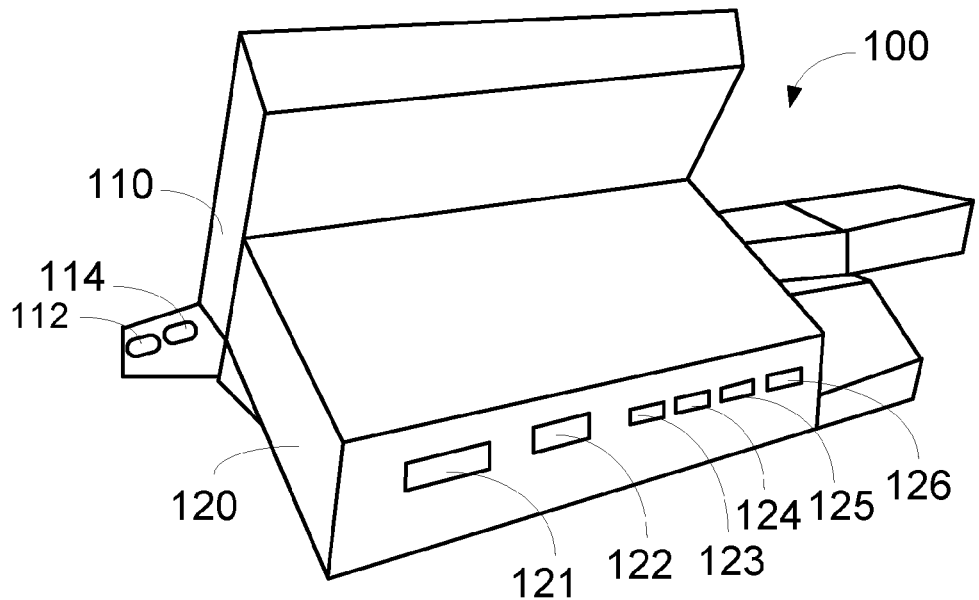
Figure 2:
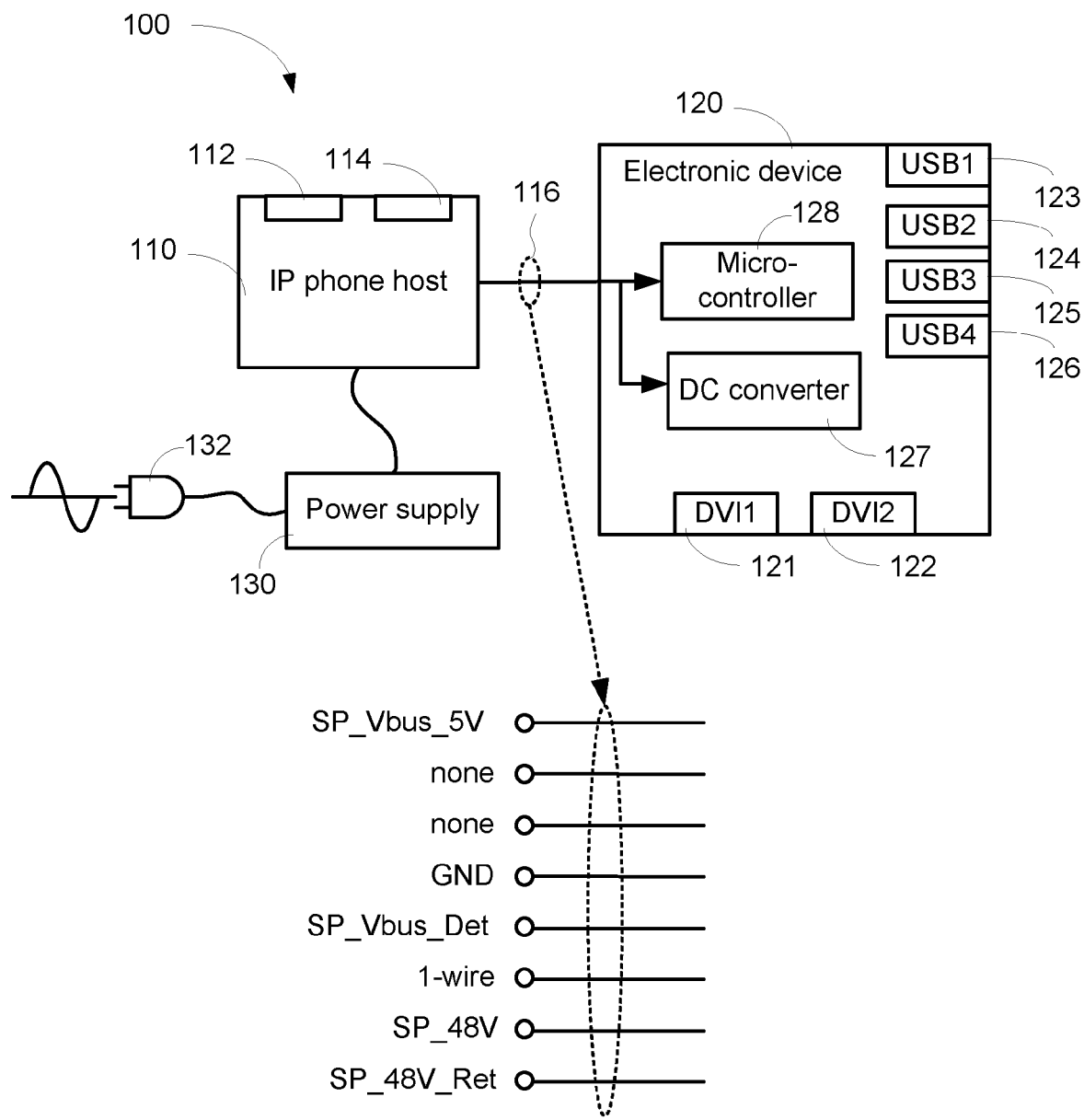
FIG. 2 shows a schematic diagram of the power supply of an IP phone system.
Figure 3:
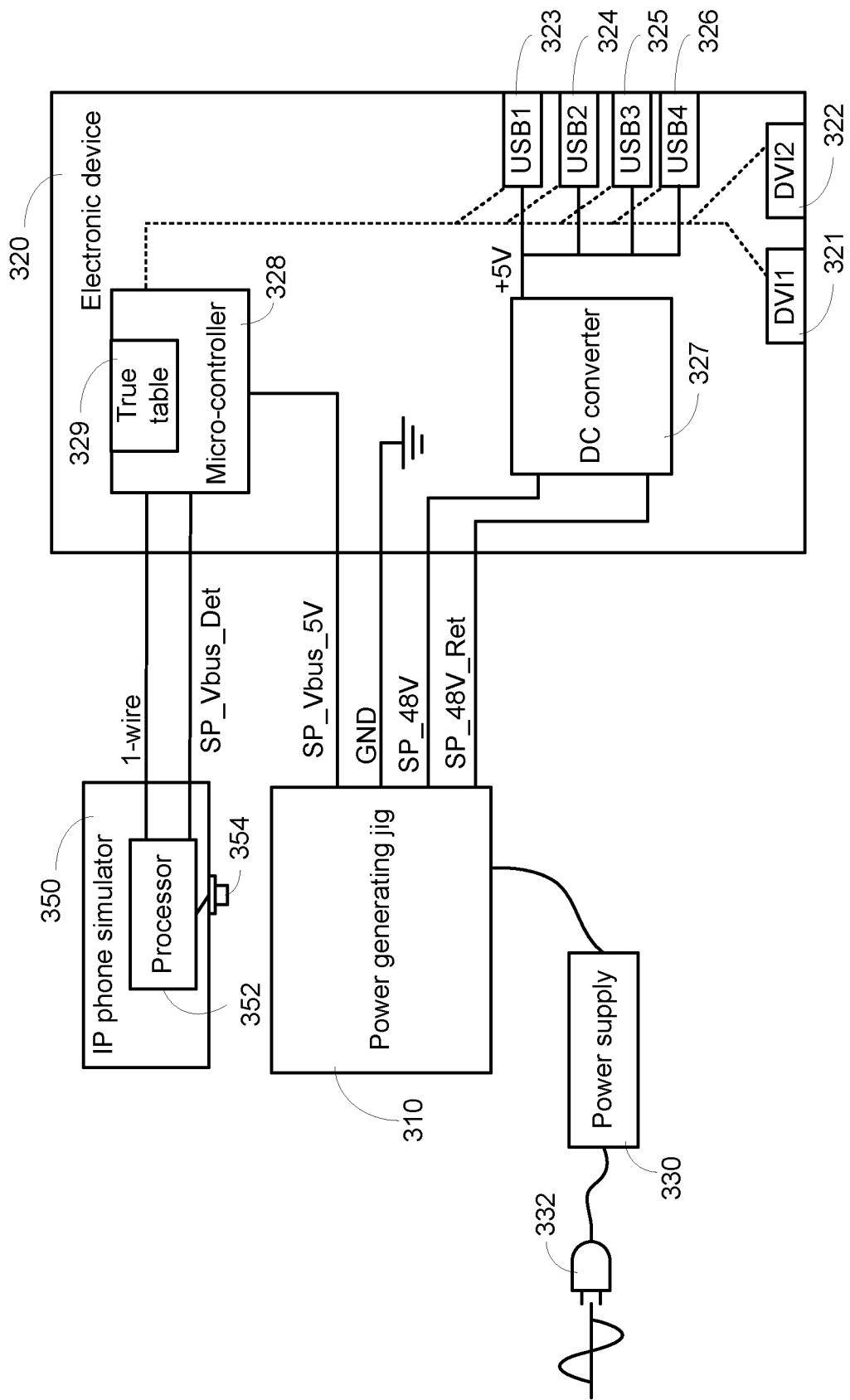
FIG. 3 shows a testing apparatus applied to an IP phone system according to one embodiment of the invention.

Referring to FIG. 3, a testing apparatus applied to an IP phone system according to one embodiment of the invention is shown. The testing apparatus is for testing an electronic device 320. As indicated in FIG. 3, the electronic device 320 comprises a micro-controller 328, a DC converter 327, DVI ports 321 and 322, and USB ports 323, 324, 325, and 326. The DC converter 327 is connected to a 48V signal line (SP__48V) and a 48V return signal line (SP__48V_Ret) to generate multiple DC voltages, wherein the +5V voltage can be provided to the USB ports 323, 324, 325, and 326. Furthermore, the micro-controller 128 receives a 5V signal line (SP_Vbus__5V), a detecting signal line (SP_Vbus_Det), and a 1-wire signal line (1-wire). The micro-controller 128 is powered by the 5V voltage provided via the 5V signal line (SP_Vbus__5V), and determines whether the IP phone host 110 is plugged according to the power level of the detecting signal line (SP_Vbus_Det). The true table 329 makes the micro-controller 329 able to control the DVI ports 321 and 322 and the USB ports 323, 324, 325, and 326.

The testing apparatus applied to an IP phone system comprises a power supply 330, a power generating jig 310, and an IP phone simulator 350. The plug 332 of the power supply 330 is plugged to an AC power for providing a DC power to the power generating jig 310. The power conversion tool 310 converts the DC voltage provided by the power supply 330 into a +5V voltage and a +48V voltage, wherein the +5V voltage is outputted via the 5V signal line (SP_Vbus__5V), the +48V voltage is outputted via the 48V signal line (SP__48V) and the 48V return signal line (SP__48V_Ret), and the grounding voltage is outputted via a grounding signal line (GND).

The IP phone simulator 350 comprises a processor 352 (such as 8051 single-chip processor), and a control key 354 connected to the processor 352. The processor 352 provides a power level via the detecting signal line (SP_Vbus_Det) for the electronic device 320 to make determination. By pressing the control key 354, the processor 352 can generate multiple modes which correspond to multiple power commands with various values and are transmitted to the electronic device 320 via the 1-wire signal line.

That is, the electronic device 320 controls the DVI ports 121 and 122 and the USB ports 123, 124, 125, and 126 according to the multiple power commands with various values issued by the IP phone simulator 350.

Referring to FIG. 4, a schematic diagram of a true table stored in a micro-controller is shown. The DVI ports 321, and 322 and the USB ports 323, 324, 325, and 326 that need to be controlled in response to various power modes are recorded in the true table. When the value of the power command is 25 W, this indicates a fully power mode, meanwhile, the DVI2 port 322 and the USB ports 323, 324, 325, and 326 are all turned on, and the USB ports can provide the maximum power (such as 500 mA).

When the value of the power command is 10 W, this indicates a minimum power mode, meanwhile, the DVI2 port 322 is turned off, the USB1 port 323 is turned on, the USB ports 324, 325, and 326 are all turned off, and the USB1 port can only provide a minimum limit power (such as 100 mA). The control details of other power modes are not repeated here.

The multiple power commands with various values issued by the IP phone simulator 350 are provided for the electronic device 320 to control the DVI ports 321 and 322 and the USB ports 323, 324, 325, and 326. The testing personnel determines whether the electronic device 320 passes the test according to whether the DVI ports 321 and 322 and the USB ports 323, 324, 325, and 326 are on or off.

Figure 5:
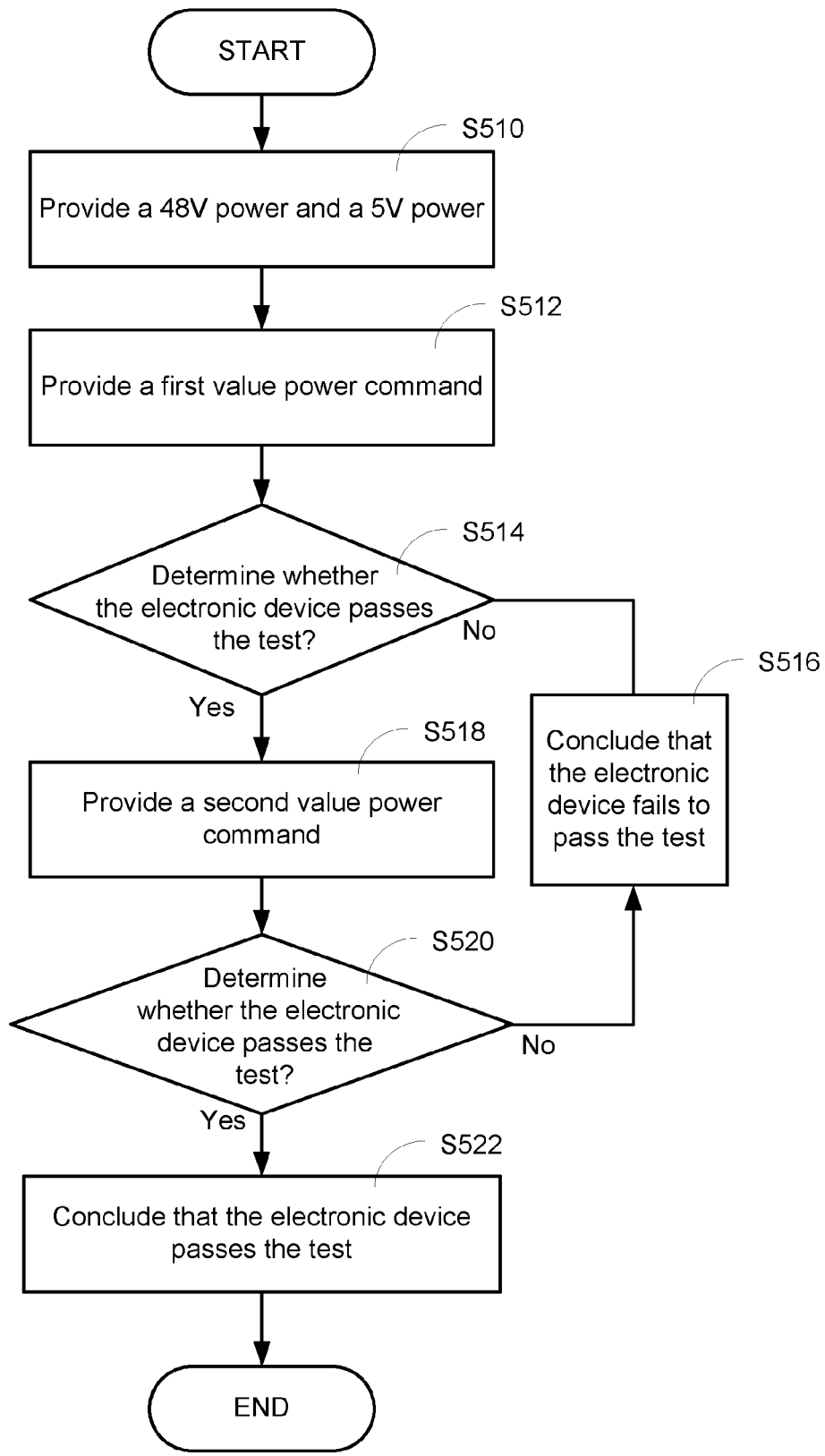
FIG. 5 shows a flowchart for testing an IP phone system according to one embodiment of the invention.

Referring to FIG. 5, a flowchart for testing an IP phone system according to one embodiment of the invention is shown. The testing process is applied to the electronic device 320. As indicated in FIG. 5, the electronic device 320 is connected to the power generating jig 310 and the IP phone simulator 350 via a cable. Next, a 48V power and a 5V power generated by the power generating jig 310 are provided to the electronic device 320 (step S510). Then, a first value power command issued by the IP phone simulator 350 is provided (step S512). Meanwhile, the testing personnel can determine whether the electronic device 320 correctly controls the DVI ports 321 and 322 and the USB ports 323, 324, and 325 according to the true table so as to determine whether the electronic device passes the test (step S514). If the electronic device 320 correctly controls the DVI ports 321 and 322 and the USB ports 323, 324, and 325, then it is concluded that the electronic device passes the test passes. Otherwise, it is concluded that the electronic device 320 fails to pass the test (step S516).

After the electronic device passes the test in step S514, a second value power command issued by the IP phone simulator 350 is provided (step S518). Meanwhile, the testing personnel determines whether the electronic device 320 correctly controls the DVI ports 321 and 322 and the USB ports 323, 324, and 325 according to the true table so as to determine whether the electronic device 320 passes the test (step S520). If the electronic device 320 correctly controls the DVI ports 321 and 322 and the USB ports 323, 324, and 325, then it is concluded that the electronic device 320 passes the test passes. Otherwise, it is concluded that the electronic device 320 fails to pass the test (step S516).

After the electronic device passes the test in step S520, it is concluded that the electronic device 320 passes the test passes (step S522), and the testing process terminates. The testing personnel can perform the testing process of FIG. 5 on another electronic device 320. As an exemplification of one embodiment of the invention, the first value power command is a 25 W power command and the second value power command is a 10 W power command. However, the number of power commands is not limited to two, and more power commands with various values can be provided for determination.

The testing method and the apparatus applied to an IP phone system and disclosed in the above embodiments of the invention are advantaged in that the electronic device can be tested more conveniently and efficiently without using any IP phone hosts.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A testing method applied to an IP phone system for testing an electronic device comprising a true table and a plurality of signal ports, wherein the testing method comprises steps of:
   connecting the electronic device to a power generating jig and an IP phone simulator via a cable;
   providing a power generated by the power generating jig to the electronic device;
   providing a first value power command issued by an IP phone simulator to the electronic device;
   determining whether the electronic device is able to correctly control the signal ports in response to the first value power command and the true table;
   providing a second value power command issued by the IP phone simulator to the electronic device;
   determining whether the electronic device wherein the second value power command is different from the first value power command is able to correctly control the signal ports in response to the second value power command and the true table; and
   concluding that the electronic device passes the test if the determination results in the determination steps are both affirmative.

2. The testing method according to claim 1, wherein the signal ports comprise a first number of DVI port and a second number of USB port.

3. The testing method according to claim 1, wherein the power generating jig provides a 48V power and a 5V power to the electronic device.

4. The testing method according to claim 1, wherein the IP phone simulator provides the first value power command and the second value power command via a 1-wire signal line of the cable.

5. A testing apparatus applied to an IP phone system, wherein the testing apparatus is connected to an electronic device of the IP phone system, the electronic device comprises a plurality of signal ports, and the testing apparatus comprises:
   a power supply having a plug for receiving and converting an AC power into a DC power;
   the power generating jig connected to the power supply for receiving the DC power so as to generate a first voltage, wherein the power generating jig comprises a first voltage signal line and a first voltage return signal line; and
   an IP phone simulator having a 1-wire signal line via which multiple power commands with various values are outputted;
   wherein, the electronic device is connected to the first voltage signal line, the first voltage return signal line, and the 1-wire signal line, such that the electronic device controls the number of on/off signal ports in response to the multiple power commands with various values so as to determine whether the electronic device operates normally.

6. The testing apparatus according to claim 5, wherein the IP phone simulator comprises a control key and a processor connected to the control key, and a plurality of modes are generated by pressing the control key, such that the processor generate multiple power commands with various values in response to the modes.

7. The testing apparatus according to claim 5, wherein the electronic device comprises a micro-controller and a true table, the micro-controller receives the multiple power commands with various values and determines the number of on/off signal ports in response to the true table.

8. The testing apparatus according to claim 7, wherein the electronic device further comprises a DC converter connected to the first voltage signal line and the first voltage return signal line, and generates a second voltage provided to the signal ports.

9. The testing apparatus according to claim 5, wherein the signal ports of the electronic device are USB ports and DVI ports.

* * * * *